US007187762B2

(12) United States Patent
Celi, Jr. et al.

(10) Patent No.: US 7,187,762 B2
(45) Date of Patent: *Mar. 6, 2007

(54) CONFERENCING ADDITIONAL CALLERS INTO AN ESTABLISHED VOICE BROWSING SESSION

(75) Inventors: Joseph Celi, Jr., Boca Raton, FL (US); Peeyush Jaiswal, Boca Raton, FL (US); Victor S. Moore, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 849 days.

This patent is subject to a terminal disclaimer.

(21) Appl. No.: 10/003,790

(22) Filed: Nov. 15, 2001

(65) Prior Publication Data

US 2003/0091027 A1    May 15, 2003

(51) Int. Cl.
*H04M 3/42* (2006.01)
(52) U.S. Cl. ............ 379/202.01; 370/260; 709/204; 709/205
(58) Field of Classification Search ........ 379/202.01; 370/260; 709/204, 205
See application file for complete search history.

(56) References Cited

U.S. PATENT DOCUMENTS

| 5,483,588 | A | * | 1/1996 | Eaton et al. ........... 379/202.01 |
| 5,894,512 | A | * | 4/1999 | Zenner ................. 379/265.02 |
| 5,903,637 | A | | 5/1999 | Hogan et al. ............. 379/203 |
| 5,915,001 | A | | 6/1999 | Uppaluru ................ 379/88.22 |
| 5,949,763 | A | | 9/1999 | Lund ......................... 370/261 |
| 5,953,392 | A | | 9/1999 | Rhie et al. .............. 379/88.13 |
| 6,064,666 | A | | 5/2000 | Willner et al. ............ 370/352 |
| 6,151,621 | A | | 11/2000 | Colyer et al. .............. 709/204 |
| 6,196,846 | B1 | | 3/2001 | Berger et al. .............. 434/118 |
| 6,208,658 | B1 | | 3/2001 | Pickett ...................... 370/401 |
| 6,243,445 | B1 | | 6/2001 | Begeja et al. ............ 379/93.01 |
| 6,269,336 | B1 | | 7/2001 | Ladd et al. ................. 704/270 |
| 6,275,575 | B1 | | 8/2001 | Wu ....................... 379/202.01 |
| 6,415,269 | B1 | * | 7/2002 | Dinwoodie ............... 705/36 R |
| 6,625,271 | B1 | * | 9/2003 | O'Malley et al. ...... 379/202.01 |
| 6,765,931 | B1 | * | 7/2004 | Rabenko et al. ............ 370/493 |
| 2001/0005372 | A1 | | 6/2001 | Cave et al. ................ 370/401 |
| 2002/0118808 | A1 | * | 8/2002 | Kelleher et al. |
| 2003/0035381 | A1 | * | 2/2003 | Chen et al. |

* cited by examiner

*Primary Examiner*—Quynh H. Nguyen
(74) *Attorney, Agent, or Firm*—Akerman Senterfitt

(57) ABSTRACT

A call conferencing method using a voice browser can include establishing a voice browsing session between a calling party and the voice browser. An inbound call from an additional party can be received and the additional party can be conferenced into the voice browsing session. The conference can provide a voice communications link between the calling party and the additional party.

18 Claims, 2 Drawing Sheets

CONFERENCING ADDITIONAL CALLERS INTO AN ESTABLISHED VOICE BROWSING SESSION

BACKGROUND OF THE INVENTION

1. Technical Field

The present invention relates to multiplexed telephonic communications, and more particularly, to multi-party voice browsing sessions.

2. Description of the Related Art

The Voice Extensible Markup Language (VoiceXML) is a markup language useful in the creation and management of computer-human dialogs. VoiceXML capitalizes on existing telephony, markup language and data communications network technologies to facilitate user interaction with various speech-enabled services. In consequence, VoiceXML brings the advantages of Web-based development and content delivery to interactive voice response applications.

For example, VoiceXML can support features such as the playback of synthesized speech, digitized speech or audio, speech recognition, recognition of dual tone multi-frequency (DTMF) key input, as well as the recording of a speech input. Moreover, since VoiceXML leverages existing telephony and Internet technologies, no specialized access device is required for accessing online content. Thus, a caller can initiate a voice browsing session with a VoiceXML application and can interact with the VoiceXML application to perform selected tasks or to access online content.

Although VoiceXML provides voice application developers with access to a substantial feature set, several deficiencies have been associated with the conventional deployment of VoiceXML solutions. For instance, presently, the VoiceXML specification does not provide a mechanism in which additional callers can access an established voice browsing session. Rather, to conference additional callers into an established voice browsing session, specialized hardware and software can be required.

SUMMARY OF THE INVENTION

The invention disclosed herein provides a method for conferencing additional callers into an established voice browsing session. In particular, additional callers can be added to an existing voice browsing session using technology disposed at the application level rather than at the hardware level. When additional callers have been added to the established voice browsing session, requests originating from all conference participants, can be processed by the voice browser handling the voice browsing session. Moreover, the conference participants both can communicate with one another over a voice link, and also can receive audio from the voice browser.

One aspect of the present invention can include a voice browser based call conferencing method. The method can include establishing a voice browsing session between a calling party and the voice browser. An inbound call can be received from an additional party and the additional party can be conferenced into the voice browsing session. The conferencing step also can include conferencing selected ones of a plurality of additional parties into the voice browsing session. In any case, the conference can provide a voice communications link between the calling party and the additional party.

The conferencing step can include determining whether the inbound call is associated with an active voice browsing session and, if so, routing the inbound call to the voice browser associated with the active voice browsing session. Also, a determination can be made as to whether the voice browser associated with inbound call is configured for multiple callers. The conferencing step further can include aggregating a voice data stream of the additional party with a voice data stream of the calling party into a single voice data stream and sending the single voice data stream for processing to the voice browser. Also, audio from the voice browser can be sent to the calling party and the additional party.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE INVENTION

The invention disclosed herein provides a method for conferencing additional callers into an voice browsing session which has been established between an initial caller and a voice browser. Specifically, the dialed number identification service (DNIS) of selected inbound calls which have been directed to a particular voice server can be used to route the inbound calls to an available and associated voice browser or voice browser application. Accordingly, as additional calls are received, the DNIS within each call can be identified and compared with active voice browsers to determine whether one of the active voice browsers has been configured to accept inbound calls for that DNIS. If so, the inbound call can be conferenced into an established voice browsing session.

Upon successfully adding the inbound call to the established voice browsing session, the voice data stream of the additional caller can be coordinated with the voice data stream of the initial caller. For example, audio from the various conference call participants can be aggregated into a single voice data stream that can be directed to an appropriate voice browser or voice browser application. Additionally, audio from the voice browser can be provided to each conference call participant or to selected participants. In any case, subsequent to adding the additional callers to the existing voice browsing session, requests originating from any of the conference call participants can be processed by the voice browser. In this manner, unlike prior art attempts at voice conferencing, additional callers can be conferenced into an established voice browsing session at the application level without requiring additional hardware.

Figure 1:
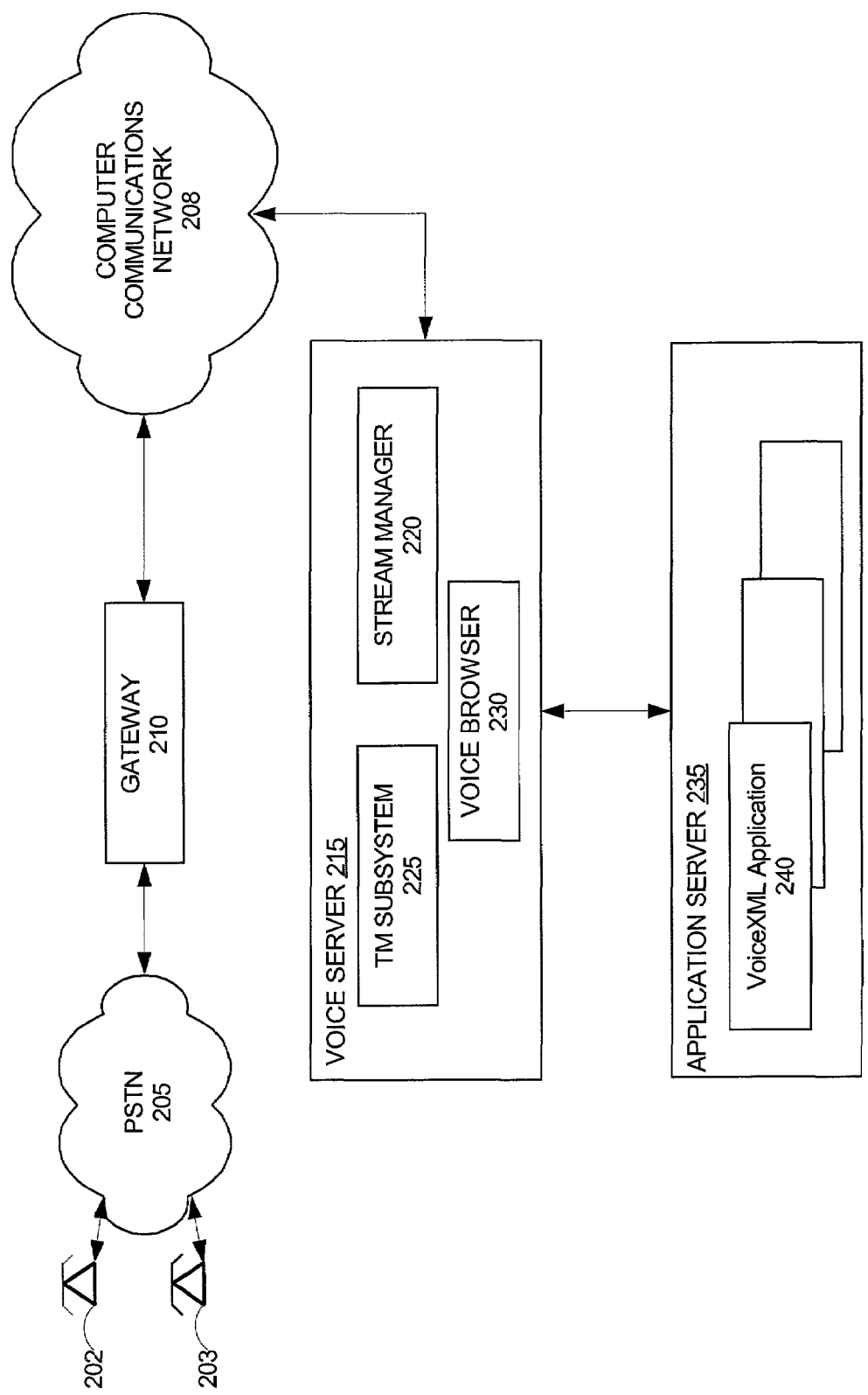
FIG. 1 is a block diagram of a speech processing system which has been configured to handle a voice browsing session in accordance with the inventive arrangements disclosed herein; and, FIG. 2 is a flow chart illustrating the call conferencing method of the present invention.

FIG. 1 is a block diagram of a speech processing system which has been configured to handle voice conferencing in accordance with the inventive arrangements. Referring to FIG. 1, the speech processing system can include a public switched telephone network (PSTN) 205, a computer communications network 208, a gateway 210, a voice server 215, and an application server 235. Callers can initiate telephone calls or other voice communications via telephones 202 and 203 which are communicatively linked to the PSTN 205. Although telephones 202 and 203 are shown in FIG. 1, any of a variety of communications devices capable of functioning as a speech interface such as voice-enabled personal digital assistants, wireless telephones, cellular telephones, or the like can be communicatively linked to the PSTN 205.

The gateway 210 can be a voice over IP (VoIP) gateway, a voice extensible markup language (VoiceXML) gateway/server, or other suitable networking device which can communicatively link the computer communications network 208, for example the Internet, with the PSTN 205. The voice server 215, which can be communicatively linked to the computer communications network 208, can include a telephony and media (TM) component 225, a voice data stream manager 220 and a voice browser 230. The voice server 215 further can include multiple instances of the TM component 225, the voice data stream manager 220, and the voice browser 230. The Voice server 215 can be configured to provide automatic speech recognition, text-to-speech, audio, as well as dual tone multi-frequency processing and generation. Alternatively, one or more of these functions can be integrated within the gateway 210.

The TM component 225 can be configured to manage call control including receipt of inbound calls as well as call setup, maintenance, and termination of calls between one or more callers to be teleconferenced and included within a voice browsing session of the voice browser 230. The TM component 225 can route audio from the voice browser to one or more of the callers engaged in the conference call and voice browsing session. For example, audio can be routed to selected individual callers or to all callers.

The voice data stream manager 220 can coordinate the various voice data streams between multiple callers engaged in the telephone conference call and participating in the voice browsing session. The voice data stream manager 220 can be configured to aggregate the various voice data streams from each caller engaged in the conference call and voice browsing session, as well as route the aggregated data stream to one or more selected application programs in the application server 235. The voice data stream manager 220 can discriminate among the voice data streams within the aggregated voice data stream to selectively route particular voice data streams to selected application programs. Still, it should be appreciated that callers involved in the conference call and voice browsing session can communicate among themselves via one or more communications links established through the PSTN 205.

The voice browser 230 can process markup languages, such as VoiceXML, which can specify computer-human dialogs. Accordingly, the voice browser 230 can receive audio input and provide audio output. Notably, the voice browser 230 can be configured to accept multiple simultaneous calls. A parameter can be included to indicate whether the voice browser 230 has been configured in this manner. For example, the voice browser 230 can be configured to process voice data streams from multiple callers that have been aggregated into a single data stream by the data stream manager 220.

The application server 235 can be communicatively linked to the voice server 215 as shown in FIG. 1. Alternatively, the application server 235 can be communicatively linked through the computer communications network 208. The application server 235 can include one or more applications, such as VoiceXML applications 240, which can be executed by the voice browser 230. Those skilled in the art will recognize that the application programs 240 can be included within the voice server 215.

Figure 2:
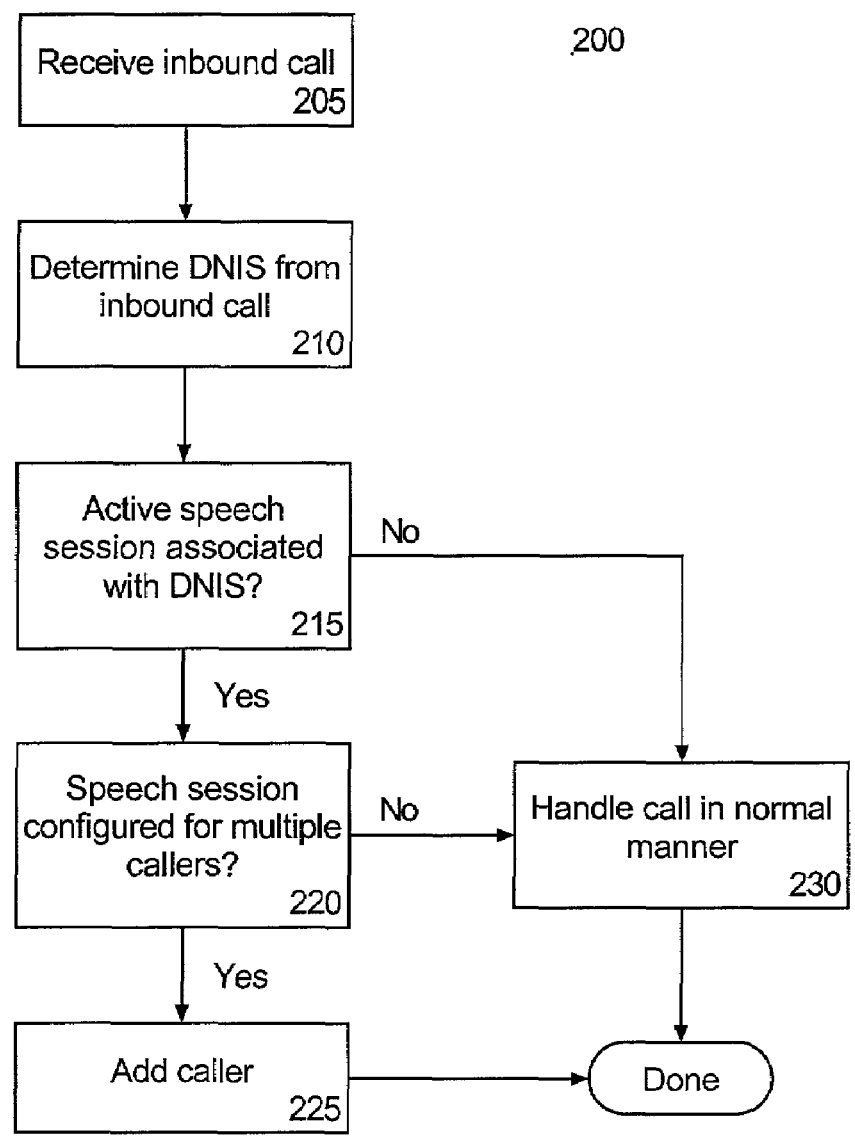

FIG. 2 is a flow chart illustrating a method 200 of teleconferencing additional callers into an existing telephone call and voice browsing session in accordance with the inventive arrangements disclosed herein. The method 200 can begin in a state wherein an existing call has been established between a caller and a voice server. The voice data stream from the caller can be directed the voice browser associated with the DNIS of the existing call. Still, the voice server can include a plurality of active voice browsers and voice browsing sessions involving different callers. In step 205, an inbound call can be received. In step 210, the DNIS of the inbound call can be identified. After completion of step 210, the method can continue to step 215.

In step 215, a determination can be made as to whether the DNIS of the inbound call is associated with an active voice browsing session and corresponding voice browser. If so, the method can continue to step 220. If not, however, the method can continue to step 230 where the inbound call can be processed in a normal manner. For example, a voice browser associated with the DNIS of the inbound call can be activated and the voice data stream of the telephone call can be directed to that voice browser.

In step 220, a determination can be made as to whether the voice browser identified as being associated with the DNIS of the inbound call has been configured to accept multiple simultaneous calls. If so, the method can continue to step 225. If not, the method can continue to step 230 where, again, the inbound call can be processed in a normal manner. Proceeding with step 225, the caller can be added to identified and active voice browsing session. For example, the voice data streams of the caller and the inbound caller can be aggregated into a single voice data stream to be routed to the voice browser associated with the identified voice browsing session. Additionally, audio from the voice browser can be selectively routed to the caller, the inbound caller, or both.

Still, it should be appreciated that more than one additional caller can be conferenced into the telephone call and the voice browsing session. Accordingly, audio from the voice browser can be selectively routed to one of a plurality of conference call participants as appropriate. Once one or more inbound callers have been added to an existing call and voice browsing session, the speech from the caller and the inbound callers can be provided to the voice browser for processing. Further, the caller and inbound callers can communicate with one another through a voice link over the PSTN for example.

The present invention can be realized in software in a centralized fashion in one computer system, or in a distributed fashion where different elements are spread across several interconnected computer systems. Any kind of computer system or other apparatus adapted for carrying out the methods described herein is suited. A typical implementation can include a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of call conferencing using a voice browser comprising:
    establishing a voice browsing session between a calling party and the voice browser;
    receiving an inbound call from an additional party;
    determining based upon a calling signal corresponding to the inbound call whether said inbound call is directed to the voice browser for which the voice browsing session has been established;
    determining whether the voice browser is configured to accept inbound calls associated with the calling signal; and
    if said inbound call is directed to the voice browser, and if the voice browser is configured to accept inbound calls associated with the calling signal, adding said inbound call to said voice browsing session, said adding providing a voice communications link between said calling party and said additional party.

2. The method of claim 1, wherein said adding step conferences selected ones of a plurality of additional parties into said voice browsing session.

3. The method of claim 1, wherein said adding step comprises:
    routing said inbound call to the voice browser based upon the calling signal.

4. The method of claim 3, wherein said adding step further comprises:
    determining whether the voice browser to which said inbound call is directed is configured for multiple callers.

5. The method of claim 3, wherein said adding step further comprises:
    aggregating a voice data stream of said additional party with a voice data stream of said calling party into a single voice data stream; and
    sending said single voice data stream for processing to the voice browser.

6. The method of claim 3, wherein said adding step further comprises:
    sending audio from the voice browser to said calling party and said additional party.

7. A machine-readable storage, having stored thereon a computer program having a plurality of code sections executable by a machine for causing the machine to perform the steps of:
    establishing a voice browsing session between a calling party and the voice browser;
    receiving an inbound call from an additional party;
    determining based upon a calling signal corresponding to the inbound call whether said inbound call is directed to the voice browser for which the voice browsing session has been established;
    determining whether the voice browser is configured to accept inbound calls associated with the calling signal; and
    if said inbound call is directed to the voice browser, and if the voice browser is configured to accept inbound calls associated with the calling signal, adding said inbound call to said voice browsing session, said adding providing a voice communications link between said calling party and said additional party.

8. The machine-readable storage of claim 7, wherein said adding step conferences selected ones of a plurality of additional parties into said voice browsing session.

9. The machine-readable storage of claim 7, wherein said adding step comprises:
    routing said inbound call to the voice browser based upon the calling signal.

10. The machine-readable storage of claim 9, wherein said adding step further comprises:
    determining whether the voice browser to which said inbound call is directed is configured for multiple callers.

11. The machine-readable storage of claim 9, wherein said adding step further comprises:
    aggregating a voice data stream of said additional party with a voice data stream of said calling party into a single voice data stream; and
    sending said single voice data stream for processing to the voice browser.

12. The machine-readable storage of claim 9, wherein said adding step further comprises:
    sending audio from the voice browser to said calling party and said additional party.

13. A method of call conferencing using a voice browser comprising:
    establishing a voice browsing session between a calling party and the voice browser;
    receiving an inbound call from an additional party;
    identifying a dialed number identification service (DNIS) within said inbound call;
    determining based upon the DNIS whether said inbound call is directed to the voice browser;
    determining whether the voice browser is configured to accept inbound calls for the DNIS; and
    if said inbound call is directed to the voice browser, and if the voice browser is configured to accept inbound calls for the DNIS, routing said inbound call to the voice browser based upon the DNIS, and adding said inbound call to said voice browsing session, said adding providing a voice communications link between said calling party and said additional party.

14. The method of claim 13, wherein said adding step conferences selected ones of a plurality of additional parties into said voice browsing session.

15. The method of claim 13, wherein said adding step further comprises:
    determining whether the voice browser associated with said inbound call is con figured for multiple callers.

16. The method of claim 13, wherein said adding step further comprises:
    aggregating a voice data stream of said additional party with a voice data stream of said calling party into a single voice data stream; and
    sending said single voice data stream for processing to the voice browser.

17. The method of claim 13, wherein said adding step further comprises:
    sending audio from the voice browser to said calling party and said additional party.

18. The method of claim 13, further comprising receiving another inbound call from another additional party and identifying a DNIS within the other inbound call to determine whether the voice browser is configured to accept inbound calls for the DNIS within the other inbound call.

* * * * *